(12) United States Patent
Desai et al.

(10) Patent No.: US 8,506,652 B2
(45) Date of Patent: Aug. 13, 2013

(54) DISPERSE DYES

(75) Inventors: Pankaj Desai, Gujarat (IN); Kiyoshi Himeno, Fukuoka (JP); Nikhil Desai, Gujarat (IN); Jay Patel, Gujarat (IN)

(73) Assignee: Colourtex Industries Limited (IN)

( * ) Notice: Subject to any disclaimer, the term of this patent is extended or adjusted under 35 U.S.C. 154(b) by 0 days.

(21) Appl. No.: 13/519,023

(22) PCT Filed: Dec. 23, 2010

(86) PCT No.: PCT/IN2010/000851
§ 371 (c)(1),
(2), (4) Date: Jun. 25, 2012

(87) PCT Pub. No.: WO2011/077462
PCT Pub. Date: Jun. 30, 2011

(65) Prior Publication Data
US 2013/0117947 A1    May 16, 2013

(30) Foreign Application Priority Data

Dec. 23, 2009   (IN) .......................... 2980/MUM/2009

(51) Int. Cl.
*D06P 5/17* (2006.01)
(52) U.S. Cl.
USPC ............... 8/456; 8/451; 8/455; 8/463; 8/464; 8/466
(58) Field of Classification Search
USPC ...................... 8/451, 455, 456, 463, 464, 466
See application file for complete search history.

(56) References Cited

FOREIGN PATENT DOCUMENTS

| DE | 953104 C | 11/1956 |
|---|---|---|
| DE | 2557523 A1 | 7/1976 |
| GB | 764308 A | 12/1956 |
| GB | 2312433 A * | 10/1997 |
| WO | 95/20014 A1 | 7/1995 |
| WO | 97/27247 A1 | 7/1997 |

OTHER PUBLICATIONS

STIC Search Report dated Mar. 15, 2013.*
International Search Report for International Application No. PCT/IN2010/000851, mailed Jul. 6, 2011, with English translation.

* cited by examiner

*Primary Examiner* — Eisa Elhilo
(74) *Attorney, Agent, or Firm* — Cantor Colburn LLP

(57) ABSTRACT

The present invention is directed to a disperse dye of formula (1) Wherein, X, Y and Z are, independently, hydrogen, halogen, cyano, nitro or $SO_2F$; Wherein at least one of X, Y and Z is $SO_2F$. $R^1$ is hydrogen, methyl, hydroxyl or $NHR^4$; $R^2$ is hydrogen, chloro or methoxy; $R^3$ is hydrogen, $(C_1-C_4)$-alkyl or —$CH_2(CH_2)_n COOCH_2CN$; $R^5$ is hydrogen, $(C_1-C_4)$-alkyl or —$CH_2(CH_2)_m COOCH_2CN$; $R^4$ is —$COCH_3$, —$COC_2H_5$, —$SO_2CH_3$ or $SO_2C_2H_5$; n and m are independently 0,1 or 2, with the proviso: —When, Y and Z both are Cl, $R^1$ is other than methyl. When, $R^2$ is Hydrogen and $R^3$, $R^4$ both are alkyl, $R^1$ is selected from $NHSO_2CH_3$ or $NHSO_2C_2H_5$. Disperse dyes of Formula (I) have excellent washing fastness and light fastness on polyester fiber and polyester blends.

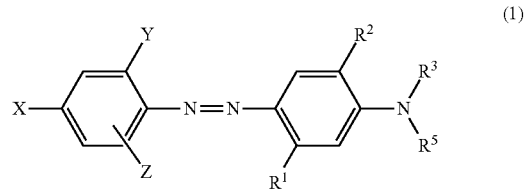

(1)

9 Claims, No Drawings

DISPERSE DYES

CROSS REFERENCE TO RELATED APPLICATIONS

This is a U.S. national stage of application No. PCT/IN2010/000851, filed on 23 Dec. 2010. Priority under 35 U.S.C. §119(a) and 35 U.S.C. §365(b) is claimed from Indian Application No. 2980/MUM/2009, filed 23 Dec. 2009, the disclosure of which are also incorporated herein by reference.

FIELD OF THE INVENTION

The present invention relates to novel disperse dyes and use thereof.

BACKGROUND OF THE INVENTION AND PRIOR ART

Traditionally, disperse dyes are used for dyeing synthetic fibers and its blend with other fibers such as cellulose, polyurethane, nylon and wool by usual exhaust dyeing, continuous dyeing and printing techniques.

Indian Patent application 2162/KOLNP/2009 which is the Indian Equivalent of WO2008074719 and entitled "Disperse dye mixtures" discloses mixtures of disperse azo dyes with anthraquinone or benzodifuranone dyes for the colouration of synthetic textile materials. The said patent emphasizes on the disperse dyes mixtures to achieve desired fastness properties.

Indian Patent number: IN 190551 (1700/DEL/94) which is the Indian equivalent of WO950200014 relates to monoazo dyes and a process for colouring synthetic textile materials, to synthetic textiles when coloured, to a process for the mass coloration of plastics, to plastics when coloured, to certain novel azo dyes and to compositions containing azo dyes. IN197577 (935/DEL/2002) and IN196765 (936/DEL/2002), divisional to Patent no: IN 190551 also teach process for the preparation of an azo dye compound.

Recently with changing trends, fashion and market requirement consumption of blended fabrics is significantly increased. These new fabrics are made out of micro size fiber using fine denier polyester fiber or blending fiber with polyurethane, nylon and wool. The fastness properties of these new colored fabrics become worse with respect to light fastness and sublimation fastness, particularly washing fastness when dyed or printed with conventional disperse dyes.

To overcome limitations of light fastness and washing fastness in disperse dyes for synthetic textiles, the inventors of the present invention we have developed range of disperse dyes with excellent overall fastness properties particularly washing fastness.

OBJECTS OF THE INVENTION

It is an object of the present invention to provide disperse azo dyes.

It is a further object of the present invention to provide disperse azo dyes that have excellent washing fastness on the polyester fiber.

It is another object of the present invention to provide a process for colouration of synthetic textile materials.

SUMMARY OF THE INVENTION

According to one aspect of the present invention there is provided Disperse Dyes of following formula,

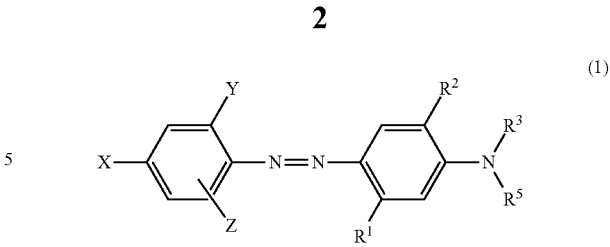

wherein,
X, Y and Z are, independently, hydrogen, halogen, cyano, nitro or $SO_2F$;
Wherein at least one of X, Y and Z is $SO_2F$.
$R^1$ is hydrogen, methyl, hydroxyl or $NHR^4$;
$R^2$ is hydrogen, chloro or methoxy;
$R^3$ is hydrogen, $(C_1-C_4)$-alkyl or $-CH_2(CH_2)_n COOCH_2CN$;
$R^5$ is hydrogen, $(C_1-C_4)$-alkyl or $-CH_2(CH_2)_m COOCH_2CN$;
$R^4$ is $-COCH_3$, $-CO\,C_2H_5$, $-SO_2CH_3$ or $SO_2C_2H_5$;
n and m are independently 0,1 or 2.
with the proviso:
  When, Y and Z both are Cl, $R^1$ is other than methyl.
  When, $R^2$ is Hydrogen and $R^3$, $R^5$ both are alkyl, $R^1$ is selected from $NHSO_2CH_3$ or $NHSO_2C_2H_5$.

Disperse dyes defined in the Formula (1) have excellent washing fastness and light fastness on the polyester fiber.

DETAILED DESCRIPTION OF THE PRESENT INVENTION

Disperse Azo Dyes are generally prepared by diazotization of primary aromatic amine and subsequently coupled with suitable coupling component.

The present invention relates to disperse dyes and methods for applying these dyes to fibers.

The disperse dyes are used for dyeing polyester and its blends with other fibers such as cellulose, polyurethane, nylon and wool by usual exhaust dyeing, continuous dyeing and printing techniques. Recently the fastness properties of colored fibers become worse in light fastness and sublimation fastness, particularly washing fastness, due to use of finer size denier polyester fiber or blending fiber with polyurethane, nylon and wool. The excellent dyestuff to endure this use is desired in this dyeing and printing field.

To solve these problems, the inventors of the present invention have engineered novel disperse azo dyestuffs with excellent fastness properties, which are showed as formula (1).

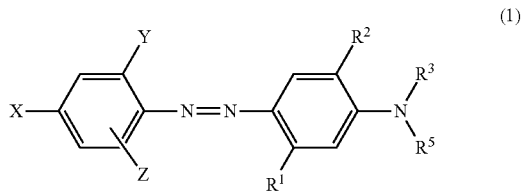

X, Y and Z are, independently, hydrogen, halogen, cyano, nitro or $SO_2F$;
Wherein at least one of X, Y and Z is $SO_2F$.
$R^1$ is hydrogen, methyl, hydroxyl or $NHR^4$;
$R^2$ is hydrogen, chloro or methoxy;
$R^3$ is hydrogen, $(C_1-C_4)$-alkyl or $-CH_2(CH_2)_n COOCH_2CN$;
$R^5$ is hydrogen, $(C_1-C_4)$-alkyl or $-CH_2(CH_2)_m COOCH_2CN$;
$R^4$ is $-COCH_3$, $-CO\,C_2H_5$, $-SO_2CH_3$ or $SO_2C_2H_5$;
n and m are independently 0,1 or 2;
with the proviso:
  When, Y and Z both are Cl, $R^1$ is other than methyl.

When, R² is Hydrogen and R³, R⁵ both are alkyl, R¹ is selected from NHSO₂CH₃ or NHSO₂C₂H₅.

Under appropriate conditions, primary aromatic amine can be successfully diazotized and coupled with specially developed coupling component to get novel disperse dyes of formula (1). These new disperse dyes possesses excellent washing and light fastness properties.

A particular aspect of the present invention provides a composition comprising a disperse dye of the present invention and additionally at least on further ingredient conventionally used in colouring application such as a disperse agent and optionally a surfactant or wetting agent. The dye composition typically comprises from 10% to 65%, preferably 20% to 50% by weight of the total dye as single component or mixture in solid medium.

The preferred dispersing agents are lignosulphonates, naphthalene sulfonic acid/formaldehyde condensates and phenol/cresol/sulphanilic acid/formaldehyde condensates. The preferred examples of wetting agent are alkyl aryl ethoxylates which may be sulphonated or phosphate and typical examples of other ingredients which may be present are inorganic salts, de-foamer such as mineral oil or nonanol, organic liquids and buffers. Disperse agents may be present at from 80% to 400% on the weight of the dye mixtures. Wetting agents may be used at from 0.1% to 20% on the weight of the dye mixtures.

The disperse dye or mixtures of disperse dyes of the present invention is milled with suitable dispersing agent using glass beads or sand in an aqueous medium. The compositions may have further additions of dispersing agents, fillers and other surfactants and may be dried, by a technique such as spray drying, to give a solid composition comprising from 15% to 65% by weight of dyestuff.

In case of dyeing with fiber materials, the dyestuffs are milled in water with dispersing agent in usual method and the finished dyes are used for dyeing or printing in the liquid form or the powder form after spray drying of the liquid. The each finished dye is used for dyeing and printing in single or mixtures of two or the more of the present invention dyes.

In case of exhaust dyeing, the polyester fiber, the conjugated fiber and the blend fiber is dyed in excellent fastness by high temperature dyeing, carrier dyeing and continuous dyeing. The dyestuff of formula (1) may be used individually or as a mixture of derivatives of formula (1) for dyeing and printing.

In the case of printing, the polyester fiber, the textile materials are processed in excellent fastness by direct printing or discharge printing.

Embodiment of the present invention will be described in more detail with reference to the following examples, in which parts are by weight unless otherwise stated.

EXAMPLES

The present invention is concretely explained as follows, but the present invention is not limited in these examples.

Example-1

Structural Formula (2)

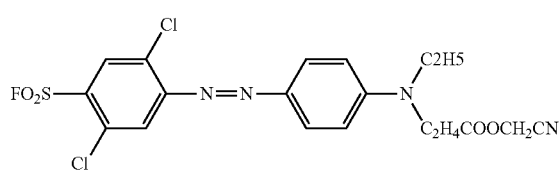

(2)

Example 1 of structural formula (2) is synthesized by following method:

40% nitrosyl sulfuric acid 3 ml is added to the mixture of 2:5-dichlorofluorosulfonyl aniline 2.0 g, acetic acid and propionic acid (86:14, 25 ml) at 0-5° C. and stirred for 2 hrs below 5° C. Coupler, N-ethyl-N-cyanomethoxy carbonyl-ethylaniline (Cyano methyl 3-(ethyl(phenyl)amino)propanoate) 2.1 g is dissolved in methanol 100 ml and the synthesized diazotized solution is added into this coupler solution at 0-5° C. The reaction mass is stirred for 1 hr below 5° C. and filtered the crystal solid and washed with water.

The 7.0 g of 50% wet cake is obtained. The yield is 80%. The λmax in acetone of example 1 dyestuff is 515 nm.

And then 2.0 g of the obtained wet press cake is milled with 2.0 g of naphthalenesulfonic acid-formaldehyde condensate and 50 g of water and 500 g of glass beads (average side is 0.8 mm of diameter.) for 24 hr and after milling, the mass is filtered to separate glass beads.

The 20 g of the obtained finished liquid is added in the 100 ml of water and kept the pH 4 with acetic acid, and 10 g piece of polyester is added into the dye bath for exhaust dyeing.

The dyeing bath is heated to 135° C. and kept for 40 min. After proper rinsing, washing and drying, the dyed material gives deep Rubine shade with excellent washing fastness, light fastness and sublimation fastness.

Fastness properties of the dyed fabrics are evaluated by following test method.

Washing Fastness as per Test Method AATCC 61 2A, Light Fastness as per Test Method ISO 105 B02 and Sublimation Test at 180 deg for 30 sec and at 210 deg for 30 sec.

Example-2

The dyestuffs of the formula (3) are synthesized using same methods described in Example-1 to get following dyes described in table:

(3)

$$FO_2S\text{-}\underset{Cl}{\overset{Cl}{\diagdown}}\text{-}N=N\text{-}\underset{R^1}{\overset{R^2}{\diagdown}}\text{-}N\underset{CH_2(CH_2)mCOOCH_2CN}{\overset{R^3}{\diagdown}}$$

| Example | R¹ | R² | R³ | R⁴ | m | λ_max(nm) |
|---------|-----|----|-----|--------|---|-----------|
| 2-1 | H | H | C₃H₇ | — | 1 | 517 |
| 2-2 | H | H | C₂H₅ | — | 2 | 522 |
| 2-3 | NHR⁴ | H | C₂H₅ | SO₂CH₃ | 1 | 530 |
| 2-4 | NHR⁴ | H | C₂H₅ | COCH₃ | 1 | 537 |
| 2-5 | OH | H | C₄H₉(n) | — | 1 | 520 |

These dyestuffs show the excellent washing fastness, light fastness and sublimation fastness.

Example-3

The dyestuffs of the formula (4) are synthesized using same methods described in Example-1 to get following dyes described in table:

(4)

$$FO_2S\text{-}\underset{Y}{\overset{X}{\diagdown}}\text{-}N=N\text{-}\underset{R^4O_2SHN}{\diagdown}\text{-}N\underset{R^5}{\overset{R^3}{\diagdown}}$$

| Example | X | Y | R⁴ | R³ & R⁵ | λ_max(nm) |
|---------|-----|-----|-------|---------|-----------|
| 3-1 | Cl | Cl | C₂H₅ | C₂H₅ | 537 |
| 3-2 | Cl | Cl | CH₃ | C₂H₅ | 537 |
| 3-3 | NO₂ | H | CH₃ | C₂H₅ | 545 |
| 3-4 | NO₂ | Cl | CH₃ | C₂H₅ | 551 |

| 3-5 | Cl | Cl | CH$_3$ | C$_2$H$_4$OCH$_3$ | 527 |
| 3-6 | Cl | Cl | CH$_3$ | C$_4$H$_9$(n) | 539 |

These dyestuffs give very brilliant shades and show the excellent washing fastness, light fastness and sublimation fastness.

Example-4

The dyestuffs of the formula (5) are synthesized using same methods described in Example-1 to get following dyes described in table:

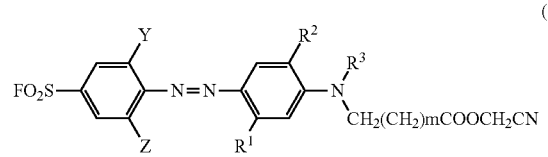

(5)

| Example | Y | Z | R$^1$ | R$^2$ | R$^3$ | R$^4$ | m | $\lambda_{max}$(nm) |
|---|---|---|---|---|---|---|---|---|
| 4-1 | NO$_2$ | H | H | H | C$_2$H$_5$ | — | 1 | 520 |
| 4-2 | NO$_2$ | H | H | H | C$_2$H$_5$ | — | 0 | 511 |
| 4-3 | NO$_2$ | H | NHR$^4$ | H | C$_2$H$_5$ | COCH$_3$ | 1 | 532 |
| 4-4 | Cl | H | H | H | C$_2$H$_5$ | — | 0 | 418 |
| 4-5 | Cl | Cl | H | H | CH$_2$COOCH$_2$CN | — | 1 | 417 |
| 4-6 | CN | H | H | H | C2H5 | — | 1 | 543 |

These dyestuffs show the excellent washing fastness, light fastness and sublimation fastness.

Example-5

The dyestuffs of the formula (6) are synthesized using same methods described in Example-1 to get following dyes described in table:

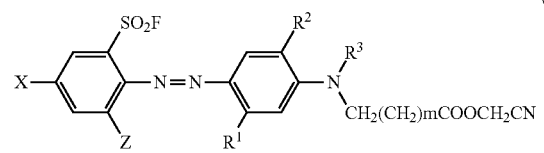

(6)

| Example | X | Z | R$^1$ | R$^2$ | R$^3$ | R$^4$ | m | $\lambda_{max}$(nm) |
|---|---|---|---|---|---|---|---|---|
| 5-1 | NO$_2$ | H | H | H | C$_2$H$_5$ | — | 1 | 523 |
| 5-2 | SO$_2$F | H | H | H | C$_2$H$_5$ | — | 1 | 511 |
| 5-3 | NO$_2$ | H | NHR$^4$ | H | CH$_2$COOCH$_2$CN | COCH$_3$ | 0 | 546 |
| 5-4 | NO$_2$ | Cl | NHR$^4$ | H | C$_2$H$_5$ | SO$_2$CH$_3$ | 1 | 570 |
| 5-5 | NO$_2$ | Cl | NHR$^4$ | OCH$_3$ | C$_2$H$_5$ | COCH$_3$ | 1 | 602 |

These dyestuffs show the excellent washing fastness, light fastness and sublimation fastness.

Example-6

The dyestuffs of the formula (7) are synthesized using same methods described in Example-1 to get following dyes described in table:

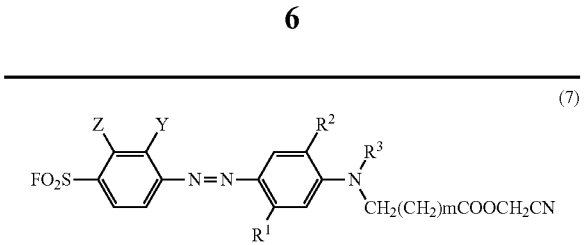

(7)

| Example | Y | Z | R$^1$ | R$^2$ | R$^3$ | R$^4$ | — | $\lambda_{max}$(nm) |
|---|---|---|---|---|---|---|---|---|
| 6-1 | Cl | Cl | H | H | C$_2$H$_5$ | — | 1 | 513 |
| 6-2 | Cl | Cl | OH | H | C$_2$H$_5$ | — | 1 | 535 |
| 6-3 | NO$_2$ | H | H | H | CH$_2$COOCH$_2$CN | — | 1 | 519 |
| 6-4 | Cl | Cl | NHR$^4$ | H | C$_2$H$_4$COOCH$_2$CN | COCH$_3$ | 1 | 526 |
| 6-5 | Cl | H | CH$_3$ | H | C$_2$H$_5$ | — | 1 | 516 |

These dyestuffs show the excellent washing fastness, light fastness and sublimation fastness.

Comparative Example 1

The following dyes written as dye of Example-37 in the Table-1 of WO95/20014 is compared with dyes written as dye Example-1 in this patent in Light Fastness, Washing Fastness and Sublimation Fastness as follows.

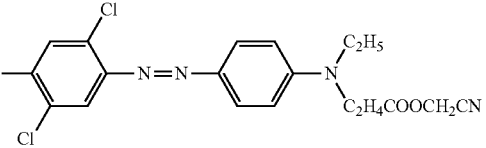

(Example 1 of this patent)

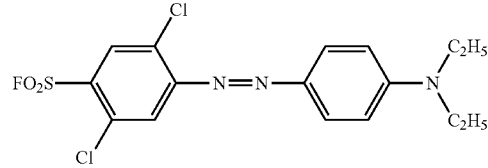

(Example 37 of WO 95/20014)

| Dye | Washing fastness (WF) | Sublimation fastness (SF) | Light fastness (LF) |
|---|---|---|---|
| Example- of this patent | 5 class | 5 class | 5 class |
| Comparative Dye 1-5 in Table-1 of WO95/20014 | 3 class | 3-4 class | 3-4 class |

Washing Fastness as per Test Method AATCC 61 2A, Light Fastness as per Test Method ISO 105 B02 and Sublimation Test at 180 deg for 30 sec and at 210 deg for 30 sec.

Dye of Example-1 of this patent and Dye-37 of WO95/20014 are very similar chemicals only except difference between ethyl group and C$_2$H$_4$COOCH$_2$CN in amino radical. But the quality differences are very big especially in washing fastness, also in sublimation fastness and light fastness. This comparative example provides confirmation to the logical approach to introduce two C$_2$H$_4$COOCH$_2$CN substituents to improve washing fastness properties instead of only one as in the case of WO95/20014. Introduction of two C$_2$H$_4$COOCH$_2$CN substituents gives more excellent washing fastness and also results in the improvement in sublimation fastness and light fastness.

Comparative Example 2

In yet another approach to increase light fastness properties of Comparative Dye Example-37 of WO95/20014 inventors of this patent have introduced —NHSO$_2$CH$_3$ or —NHSO$_2$C$_2$H$_5$ substituent in the 3-(meta) position of coupling component and following comparison data clearly shows superior properties achieved by intended changes:

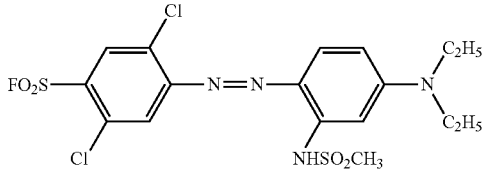

(Example 3.2 of this patent)

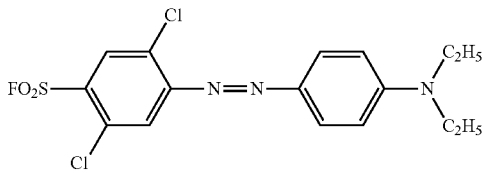

(Example 37 of WO 95/20014)

| Dye | Washing fastness (WF) | Sublimation fastness (SF) | Light fastness (LF) |
|---|---|---|---|
| Example-3-2 of this patent | 4-5 class | 5 class | 5-6 class |
| Comparative Dye 1-5 in Table-1 of WO95/20014 | 3 class | 3-4 class | 3-4 class |

Washing Fastness as per Test Method AATCC 61 2A, Light Fastness as per Test Method ISO 105 B02 and Sublimation Test at 180 deg for 30 sec and at 210 deg for 30 sec.

Dye of Example-3.2 of this patent and Dye-37 of WO95/20014 are very similar chemicals only except difference between —NHSO$_2$CH$_3$ in coupling component. But the quality differences are very big especially in light fastness, also in sublimation fastness and washing fastness. This comparative example provides confirmation to the logical approach to introduce —NHSO$_2$CH$_3$ substituent to improve Light Fastness properties of comparative Dye-37 of the WO95/20014. Introduction of —NHSO$_2$CH$_3$ substituent gives excellent light fastness and also results in the improvement in sublimation fastness and washing fastness.

While the invention has been described in conjunction with specific embodiments thereof, it is evident that many alternatives, modifications and variations will be apparent to those skilled in the art in the light of forgoing description. Accordingly, it is intended to include all such alternatives, modifications, and variations as set forth within the spirit and broad scope of the appended claims.

The invention claimed is:

1. Novel disperse azo dyes of formula (1)

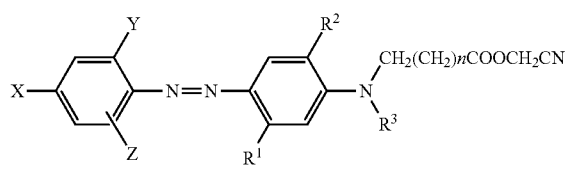

(1)

wherein,
X, Y and Z are, independently, hydrogen, halogen, cyano, nitro or SO$_2$F;
Wherein at least one of X, Y and Z is SO$_2$F.
R$^1$ is hydrogen, methyl, hydroxyl or NHR$^4$;
R$^2$ is hydrogen, chloro or methoxy;
R$^3$ is hydrogen, (C$_1$-C$_4$)-alkyl or CH$_2$ (CH$_2$)$_n$COOCH$_2$CN;
R$^4$ is —COCH$_3$, —CO C$_2$H$_5$, —SO$_2$CH$_3$ or SO$_2$C$_2$H$_5$;
n and m are independently 0,1 or 2.

with the proviso:
When, Y and Z both are Cl, R$^1$ is other than methyl.

2. Novel disperse azo dyes according to claim 1 in which the compound of formula (1) is of formula (2):

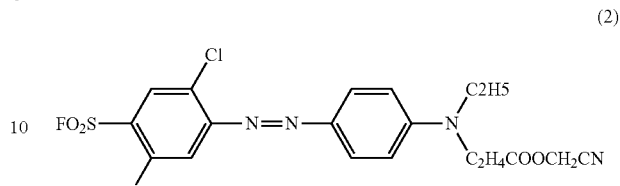

(2)

3. Novel disperse azo dyes according to claim 1 in which the compound of formula (1) is of formula (3):

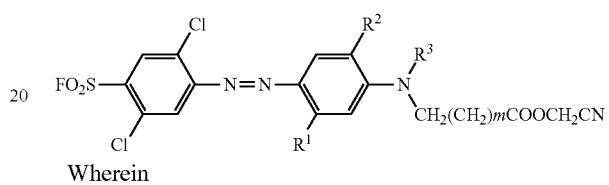

(3)

Wherein

| R$^1$ | R$^2$ | R$^3$ | R$^4$ | m |
|---|---|---|---|---|
| H | H | C$_3$H$_7$ | — | 1 |
| H | H | C$_2$H$_5$ | — | 2 |
| NHR$^4$ | H | C$_2$H$_5$ | SO$_2$CH$_3$ | 1 |
| NHR$^4$ | H | C$_2$H$_5$ | COCH$_3$ | 1 |
| OH | H | C$_4$H$_9$(n) | — | 1 |

4. Novel disperse azo dyes of formula (4):

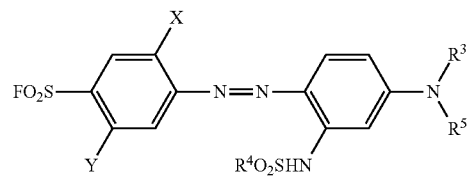

(4)

Wherein,

| X | Y | R$^3$ | R$^5$ | R$^4$ |
|---|---|---|---|---|
| Cl | Cl | C$_2$H$_5$ | C$_2$H$_5$ | CH$_3$ |
| Cl | Cl | C$_2$H$_5$ | C$_2$H$_5$ | C$_2$H$_5$ |
| NO2 | H | CH$_3$ | C$_2$H$_5$ | CH$_3$ |
| NO2 | H | CH$_3$ | C$_2$H$_5$ | C$_2$H$_5$ |
| NO2 | Cl | CH$_3$ | C$_2$H$_5$ | CH$_3$ |
| NO2 | Cl | CH$_3$ | C$_2$H$_5$ | C$_2$H$_5$ |
| Cl | Cl | CH$_3$ | C$_2$H$_4$OCH$_3$ | CH$_3$ |
| Cl | Cl | CH$_3$ | C$_2$H$_4$OCH$_3$ | C$_2$H$_5$ |
| Cl | Cl | CH$_3$ | C$_4$H$_9$(n) | CH$_3$ |
| Cl | Cl | CH$_3$ | C$_4$H$_9$(n) | C$_2$H$_5$ |

5. Novel disperse azo dyes according to claim 1 in which the compound of formula (1) is of formula (5):

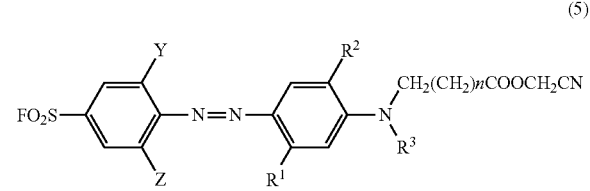

(5)

Wherein,

| Y | Z | R¹ | R² | R³ | R⁴ | m |
|---|---|----|----|----|----|---|
| NO₂ | H | H | H | C₂H₅ | — | 1 |
| NO₂ | H | H | H | C₂H₅ | — | 0 |
| NO₂ | H | NHR⁴ | H | C₂H₅ | —COCH₃ | 1 |
| Cl | Cl | H | H | C₂H₅ | — | 0 |
| Cl | Cl | H | H | CH₂COOCH₂CN | — | 1 |
| CN | H | H | H | C₂H₅ | — | 1 |

6. Novel disperse azo dyes according to claim 1 in which the compound of formula (1) is of formula (6):

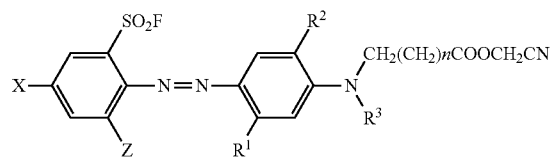

(6)

Where in,

| X | Z | R¹ | R² | R³ | R⁴ | m |
|---|---|----|----|----|----|---|
| NO₂ | H | H | H | C₂H₅ | — | 1 |
| SO₂F | H | H | H | C₂H₅ | — | 1 |
| NO₂ | H | NHR⁴ | H | CH₂COOCH₂CN | COCH₃ | 0 |
| NO₂ | Cl | NHR⁴ | H | C₂H₅ | SO₂CH₃ | 1 |
| NO₂ | Cl | NHR⁴ | OCH₃ | C₂H₅ | COCH₃ | 1 |

7. Novel disperse azo dyes according to claim 1 in which the compound of formula (1) is of formula (7):

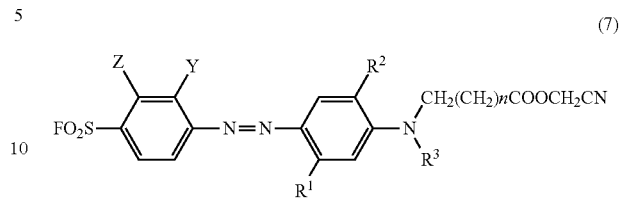

(7)

Wherein,

| Y | Z | R¹ | R² | R³ | R⁴ | m |
|---|---|----|----|----|----|---|
| Cl | Cl | H | H | C₂H₅ | — | 1 |
| Cl | Cl | OH | H | C₂H₅ | — | 1 |
| NO₂ | H | H | H | CH₂COOCH₂CN | — | 1 |
| Cl | Cl | NHR⁴ | H | C₂H₄COOCH₂CN | COCH₃ | 1 |
| Cl | H | CH₃ | H | C₂H₅ | — | 1 |

8. A disperse dye composition according to claim 1 comprising an azo dye of formula (1) or a mixture thereof, dispersing agent in the range of 80% to 400% by weight of the dye mixture, and optionally a wetting agent in the range for 0.1% to 20% by weight of the dye mixture.

9. Dyed material according to claim 1 as a single component or in combination of two or more dyestuffs.

* * * * *